United States Patent
Mohr et al.

(10) Patent No.: US 10,215,059 B2
(45) Date of Patent: Feb. 26, 2019

(54) ACTIVE DRAFT CONTROL FOR COMBINED CYCLE POWER PLANT SHUTDOWN

(71) Applicant: General Electric Company, Schenectady, NY (US)

(72) Inventors: Wolfgang Franz Dietrich Mohr, Niederweningen (CH); Kurt Rechsteiner, Buchs (CH); David Martin Johnson, Simpsonville, SC (US); Kenneth Damon Black, Travelers Rest, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 32 days.

(21) Appl. No.: 15/611,832

(22) Filed: Jun. 2, 2017

(65) Prior Publication Data

US 2018/0347407 A1    Dec. 6, 2018

(51) Int. Cl.

| F01K 13/02 | (2006.01) |
|---|---|
| F02C 9/20 | (2006.01) |
| F01K 23/06 | (2006.01) |
| F01K 13/00 | (2006.01) |
| F02C 9/16 | (2006.01) |
| F02C 9/18 | (2006.01) |

(52) U.S. Cl.
CPC ............ *F01K 13/02* (2013.01); *F01K 13/003* (2013.01); *F01K 23/06* (2013.01); *F02C 9/16* (2013.01); *F02C 9/18* (2013.01); *F02C 9/20* (2013.01); *Y02E 20/14* (2013.01); *Y02E 20/16* (2013.01)

(58) Field of Classification Search
CPC ........ F01K 13/02; F01K 23/06; F01K 13/003; F02C 9/20; F02C 9/18; F02C 9/16; Y02E 20/16; Y02E 20/14
USPC ....................................................... 60/39.182
See application file for complete search history.

(56) References Cited

U.S. PATENT DOCUMENTS

| 4,099,374 A * | 7/1978 | Foster-Pegg | .......... F01K 23/067 60/39.12 |
|---|---|---|---|
| 8,448,418 B2 | 5/2013 | Ouellet et al. | |
| 2014/0130476 A1* | 5/2014 | Nakamura | ............ F01K 23/105 60/39.182 |
| 2014/0150447 A1* | 6/2014 | Ekanayake | ............. F01K 13/02 60/778 |
| 2015/0218974 A1* | 8/2015 | Florey | ................... F01K 23/101 60/39.182 |
| 2016/0326966 A1 | 11/2016 | Mohr et al. | |

* cited by examiner

*Primary Examiner* — Hoang Nguyen
(74) *Attorney, Agent, or Firm* — Dority & Manning, P.A.

(57) ABSTRACT

A system and method for active draft control through a combined cycle power plant (CCPP) can initiate a CCPP shutdown, activate the recirculated exhaust gas (REG) system for the turbomachine; measure a HRSG airflow through the HRSG; communicate the HRSG airflow to a controller configured to condition a control signal; and adjust a recirculated exhaust gas volume in accordance with the control signal.

20 Claims, 2 Drawing Sheets

ACTIVE DRAFT CONTROL FOR COMBINED CYCLE POWER PLANT SHUTDOWN

FIELD OF THE DISCLOSURE

The disclosure relates generally to turbomachines, and more specifically, to methods and systems for controlling naturally induced airflow drafting through combined cycle power plant (CCPP) equipment during shutdown.

BACKGROUND OF THE DISCLOSURE

Combined cycle power plants with turbomachines and heat recovery steam generators (HRSG) are connected to electrical grids that require flexible operation to meet changing power demands. Some power grid cycles command the turbomachines to stop during low demand periods and restart soon thereafter to meet electric power demands of the grid. During operation of the turbomachine and HRSG, the various components expand and contract. For example, thermal expansion may occur due to the relatively high temperature associated with turbine operation, and mechanical expansion may occur due to centripetal forces associated with rotation of the interior components.

Turbomachine components expand and contract at different and varying rates. The varying rates result from component differences in material, geometry, location, and purpose. To accommodate for the discrepancy in expansion and contraction rates, a clearance is designed into the turbomachine between the tips of the blades and shroud, typically referred to as tip clearance. The tip clearance reduces the risk of turbine damage by permitting the blades to expand without contacting the shroud. However, the tip clearance substantially reduces the efficiency of the turbine by permitting a portion of the heated gas to escape past the blades without performing useful work, which wastes energy that would otherwise be available for extraction. A similar clearance may be designed into the compressor between the compressor blades and the compressor case, which may permit air to escape past the compressor blades without compressing.

The size of the tip clearance may vary over stages in an operational cycle of the turbomachine, due to varying thermal and mechanical conditions in the turbomachine. The turbomachine is typically initiated from a "cold start" by increasing the rotor speed and subsequently drawing a load, which effects the clearance between the tips of the turbine blades and the turbine shroud. The turbomachine may then be shutdown for a brief period, such as to correct an issue or due to power demands. During shutdown, the load may be removed, the rotor speed may be reduced, and the components may begin contracting and cooling. Subsequently, a "hot restart" may occur, wherein the turbomachine is restarted before the components return to cold build conditions.

Tight tip clearances observed during the hot restart cycle may be due in part to the turbomachine cooling relatively faster on the exterior (stator) than the interior (rotor) during shutdown. For example, the interior components of the turbine may remain warm, while the stator case may cool and contract toward the interior. The cooling of the stator case may be exacerbated by induced cooling air flow traveling along the length of the turbomachine during shutdown. The turbomachine may have a series of inlet guide vanes positioned along the compressor, which permit air to enter the turbomachine for compression and subsequent expansion. Because these inlet guide vanes may remain at least partially open during shutdown, air may continue to pass into the compressor. The induced air travels along the length of the turbomachine, with flow being supported by the angular momentum of the rotor, and may continue rotating the rotor before entering the HRSG. The induced draft may further cool the stator case during shutdown, thereby resulting in tighter clearances on hot restart.

During shutdown, ambient air infiltration can be naturally induced through the compressor and hot gas path by natural convection of the hot gas contained in the turbomachine, HRSG, flue gas stacks, and due to the pressure differences caused by the wind speed and wind direction at the turbomachine inlet. This ambient air infiltration cools the turbomachine and HRSG which is detrimental to a quick restart due to temperature operational constraints imposed by the turbomachine and HRSG.

Thus, in order to allow restarting of the turbomachine and HRSG as quickly as possible, the induced draft through the turbomachine and HRSG can be actively controlled. Traditionally, in order to counteract the draft, the variable inlet guide vanes of the turbomachine compressor (i.e. the vanes provided at the inlet of the compressor to control the air flow through the turbomachine) are closed and/or intake dampers and louvers (provided e.g. in the inlet section upstream of the compressor) and/or stack dampers (provided e.g. at the stack) are closed. The traditional approach reduces the natural draft through the turbomachine and possibly the heat recovery steam generator, but because of leakages there can still be a substantial amount of induced natural draft.

BRIEF DESCRIPTION OF THE DISCLOSURE

Aspects and advantages of the disclosure will be set forth in part in the following description, or may be obvious from the description, or may be learned through practice of the disclosure.

In one embodiment, a method for active draft control through a combined cycle power plant (CCPP) is disclosed as having the steps of; initiating a CCPP shutdown, the CCPP comprising a turbomachine and a heat recovery steam generator (HRSG); activating a recirculated exhaust gas (REG) system for the turbomachine, measuring a HRSG airflow through the HRSG; communicating the HRSG airflow to a controller configured to condition a control signal; and adjusting a recirculated exhaust gas volume in accordance with the control signal.

In another embodiment, a system for actively controlling draft through a combined cycle power plant (CCPP) is disclosed as having a turbomachine, a heat recovery steam generator (HRSG) comprising a HRSG exhaust stack, a bypass exhaust stack, and a recirculated exhaust gas (REG) system. After initiating a CCPP shutdown, the recirculated exhaust gas (REG) system is activated for the turbomachine. The REG system can recirculate a minimum purge airflow. By measuring a HRSG airflow through the HRSG and communicating the HRSG airflow to a controller configured to condition a control signal, the recirculated exhaust gas volume can be adjusted in accordance with the control signal.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
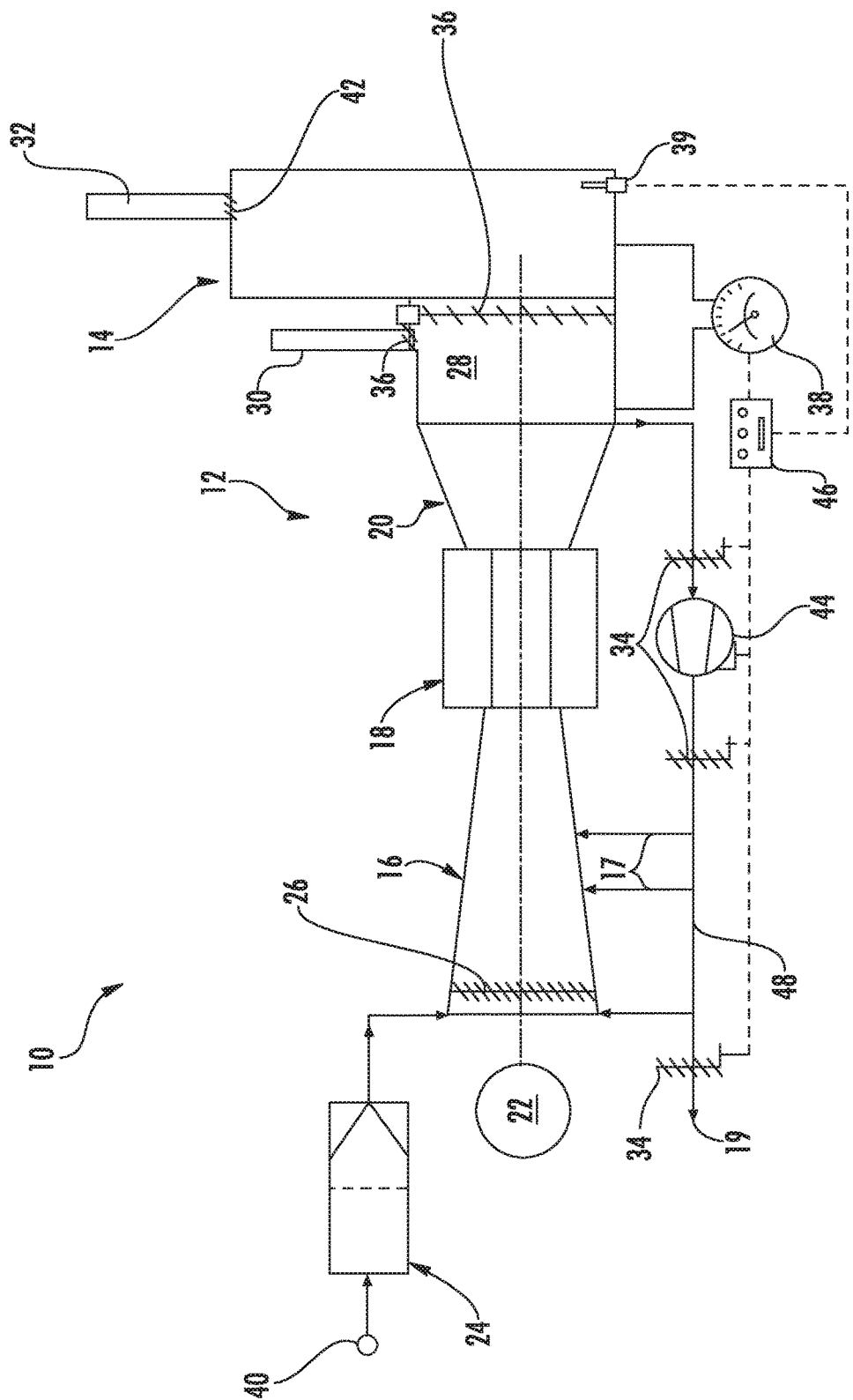
FIG. 1 is a schematic of a typical combined cycle power plant (CCPP) showing an embodiment of a recirculated exhaust gas (REG) system for draft control.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial turbomachine for purposes of illustration, one of ordinary skill in the art will readily appreciate that embodiments of the present invention may be applied to any turbomachine including but not limited to an aero-derivative turbine, marine turbomachine as well as an aero engine turbine, unless specifically recited in the claims.

Disclosed herein are systems and methods of controlling naturally induced airflow drafting through power plant equipment during shutdown thereby reducing heat loss from stator casing of a turbomachine and outer casing of a HRSG during a shutdown cycle. Drafting may be induced through the turbomachine in either a downstream direction (normal flow direction) or an upstream direction (reverse or opposite flow direction), depending on operating and environmental conditions. By reducing heat loss from the exterior at shutdown, the systems and methods may increase clearances between the blade tips and the stator case during a hot restart cycle thus avoiding tip rub during hot restart. In other words, by reducing heat loss of the stator casing during the shutdown cycle, larger clearances may be achieved during the hot restart cycle, which may permit tightening the clearances during the steady state cycle to increase efficiency.

Referring now to the drawings, wherein like numerals refer to like components, FIG. 1 illustrates a combined cycle power plant (CCPP) 10 including a turbomachine 12 and a heat recovery steam generator 14. The turbomachine 12 comprises a compressor 16, a combustion chamber 18 and a turbine 20. The turbomachine 12 can be connected to an electric generator 22 that is in turn electrically connected to an electric grid. In other applications the turbomachine 12 can be connected to other machines according to the need and design.

Upstream of the compressor 16, the turbomachine 12 has an inlet section 24 for the ambient air intake 40 coming from the environment to be supplied to the compressor 16. In addition, the compressor 16 is typically provided with variable inlet guide vanes 26 to control the amount of air that is supplied to the compressor 16.

Downstream of the turbine 20, a discharge chamber 28 is typically provided. The discharge chamber 28 can be connected to a bypass stack 30 and/or the discharge chamber 28 can be connected to the heat recovery steam generator (HRSG) 14. In the HRSG 14, steam is generated by cooling the exhaust gas from the discharge chamber 28. Downstream of the heat recovery steam generator 14, the HRSG stack 32 is provided to exhaust gas to atmosphere. A HRSG stack damper 42 is also provided to close and control exhaust gas from the HRSG.

The CCPP 10 can further have a bypass fan 44 to recirculate exhaust gas through the turbomachine 12, thereby controlling naturally induced airflow drafting through the CCPP 10 during shutdown. Alternatively, the bypass fan 44 can exhaust the recirculated exhaust gas to ambient, for example through a ductwork exhaust grill, while drawing intake for the recirculated exhaust gas through the intake section. During shutdown conditions, the static pressure difference through the heat recovery steam generator 14 can be measured by a differential pressure gage 38. Alternatively, airflow velocity through the HRSG 14 can be measured using, for example, a hot-wire anemometer 39 that can communicate with the controller 46 and REG system 50 (see FIG. 2) to maintain a no-flow condition through the HRSG 14. The differential pressure gage 38 communicates with a controller 46 to condition a control signal and maintain a pressure difference ($\Delta P$) setpoint across the HRSG 14 or across any two predetermined points in the CCPP 10. With a constant $\Delta P$ setpoint in the range of about 0 to 0.01 psig across the HRSG 14, or across any two predetermined points in the CCPP 10, no induced airflow draft passes through the HRSG 14 or the HRSG stack 32 thereby forcing any non-recirculated exhaust gas up the bypass stack 30. The $\Delta P$ control setpoint and static probe locations will require field adjustment to accommodate site-specific build conditions and changing operational conditions of the CCPP 10. Optionally, a set of linked shutoff dampers 36 can serve to physically close the HRSG 14 inlet and open the bypass stack 30 damper to exhaust any induced draft to atmosphere. Optionally, a pressure gage can measure the pressure difference across linked shutoff dampers 36 and send it to the controller 46 to adjust the recirculated exhaust gas 48 volume and prevent any induced leakage or draft from passing through the linked shutoff dampers 36 and subsequently through the HRSG 14. As ambient conditions and internal CCPP 10 temperatures change, infiltrated air attempting to draft through the HRSG 14 can either be recirculated through the turbomachine 12 by the bypass fan 44 or exhausted through the bypass stack 30, depending on the control signal from the controller 46. With the bypass fan 44 running, the recirculated exhaust gas 48 can either be supplied to the turbine inlet section 24, supplied to any turbomachine casing inlet 17, or supplied to an ambient REG exhaust 19. When ambient conditions permit the ambient REG exhaust 19 to be used, the recirculated exhaust gas 48 is not truly recirculated but can be drawn through the turbomachine 12 from the inlet section 24 as a once-through flow system, similar to a typical HVAC economizer cycle where outside air (ambient air) is used for heating or cooling purposes. Recirculated exhaust gas 48 can also be taken from the discharge chamber 28 or the bypass stack 30 and supplied upstream of the variable inlet guide vanes 26 at the turbomachine 12 inlet or to any turbomachine casing opening 17, for example from extraction piping. Recirculated exhaust gas 48 can also be supplied to a separate inlet section 24. As draft induction conditions increase, for example higher ambient wind conditions, higher exhaust gas temperatures, changing temperature profile in the HRSG 14, and/or minimum required purge airflow through the hot section of the turbomachine 12, the differential pressure gage 38 or hot-wire anemometer 39 senses the ΔP or HRSG airflow exceeding the controller 46 setpoint (ΔP typically in the range of 0 to 0.01 psig and the hot-wire anemometer typically set near zero airflow) and the controller 46 sends a control signal to increase the speed of the bypass fan 44 to recirculate more air to maintain setpoint. The minimum required purge airflow can be separately controlled using a turbomachine internal control circuit that rotates the turbomachine rotor using, for example, a rotor turning gear or the generator 22 in motoring mode. Alternatively, the controller 46 can communicate with a single speed, on-off bypass fan 44 and can modulate recirculated exhaust gas 48 using control dampers 34. At least one of the control dampers 34 can be inlet vanes on the bypass fan 44. The control dampers 34 can also serve as shutoff dampers when no recirculation is required.

Figure 2:
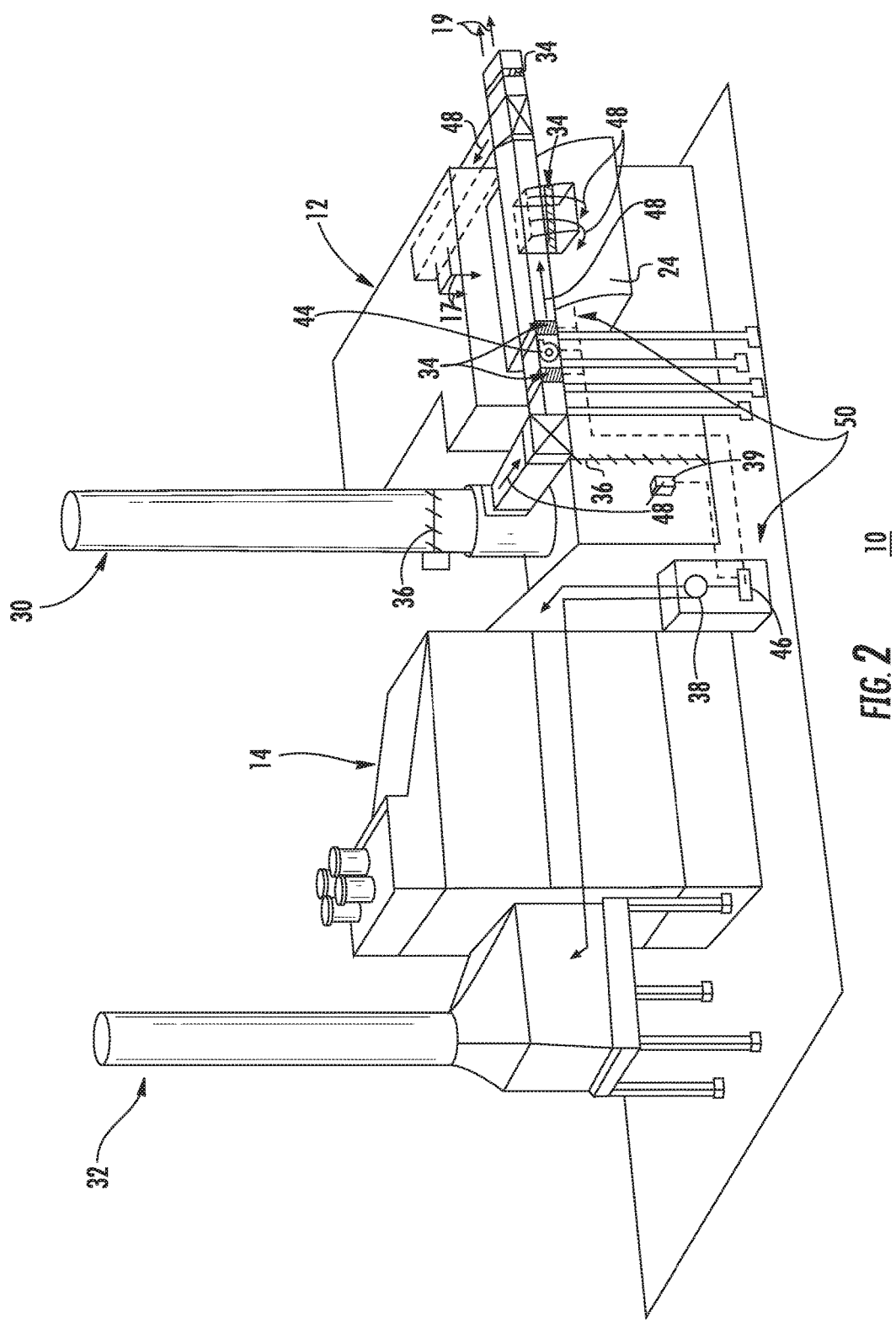
FIG. 2 is an illustration of an embodiment of the REG system on a typical combined cycle power plant site.

FIG. 2 is an illustration of an embodiment of the present invention on a combined cycle power plant site 10. The recirculated exhaust gas (REG) system 50 has multiple elements. The configuration and sequence of these elements may be dictated by the designed volume of recirculated exhaust gas 48 and the type of turbomachine. Furthermore, alternate embodiments of the REG system 50 may include additional or fewer components than the components described herein. Therefore, various arrangements, and/or configurations, which differ from FIG. 2, may be integrated with an embodiment of the present invention.

As illustrated in FIG. 2, the CCPP 10 can have a turbomachine, such as an enclosed turbomachine 12, an enclosed heat recovery steam generator (HRSG) 14, a HRSG exhaust stack 32, a bypass exhaust stack 30, and a REG system 50. The REG system 50 may include, for example, but not limited to least one control damper 34, a bypass fan 44, a differential pressure gage 38, a hot-wire anemometer 39, and controller 46, and optionally linked shutoff dampers 36. During CCPP 10 shutdown, the REG system 50 operates as described above by sensing and maintaining the static pressure difference across the HRSG 14 in the range of 0 to 0.01 psig, or sensing and maintaining the HRSG airflow near zero, and by recirculating any induced draft airflow attempting to pass through the CCPP 10. During shutdown conditions, the static pressure difference through the heat recovery steam generator 14 is measured by a differential pressure gage 38, or a hot-wire anemometer 39 measures HRSG airflow. The differential pressure gage 38 or hot-wire anemometer 39 can communicate with a controller 46 to condition a control signal and maintain a pressure difference (ΔP) or airflow across the linked shutoff dampers 36, the HRSG 14, and or the HRSG stack damper 42. By controlling the REG system 50 to a field adjusted ΔP setpoint, no induced airflow passes through the HRSG 14 thereby maintain a no-flow condition through the HRSG 14. Optionally, a set of linked shutoff dampers 36 can serve to physically close the HRSG 14 inlet and open the bypass stack 30 damper to exhaust any induced draft to atmosphere and prevent any induced draft from passing through the HRSG 14.

Additionally, the REG system 50 can communicate with any portion of the CCPP 10 internal control system (not shown) to establish control parameters such as HRSG ΔP, recirculated exhaust gas 48 flowrate, turbomachine variable inlet guide vanes 26 settings, turbomachine turning gear operation, recirculated exhaust gas temperatures, HRSG and bypass stack damper operations, and other parameters that can affect CCPP shutdown cooling rates as well as hot restart operations. The REG system 50 may monitor an operational cycle of the turbomachine 12 to know when the turbomachine 12 enters a shutdown cycle. The shutdown cycle may be triggered for a variety of reasons, such as in response to a trip condition or at the initiation by the operator.

Additionally, the REG system 50 may initiate recirculation of exhaust gas 48 to warm the turbomachine 12 stator case and reduce heat loss associated with shutdown of the turbomachine 12. It also should be noted that the REG system 50 may operate in response to conditions other than a shutdown of the turbomachine 12, which may permit altering the contraction or expansion rate of the stator case to achieve desired clearances during other cycles of operation.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for active draft control through a combined cycle power plant (CCPP), comprising the steps of:
   initiating a CCPP shutdown, the CCPP comprising a turbomachine and a heat recovery steam generator (HRSG);
   measuring an HRSG airflow through the HRSG;
   communicating the HRSG airflow to a controller configured to condition a control signal; and
   adjusting a recirculated exhaust gas volume through a REG system in accordance with the control signal.

2. The method of claim 1, wherein the recirculated exhaust gas (REG) system further comprises a minimum purge airflow.

3. The method of claim 1, wherein the HRSG airflow is measured by a differential pressure gage, hot-wire anemometer, and combinations thereof.

4. The method of claim 1, wherein the recirculated exhaust gas (REG) system further comprises a bypass fan.

5. The method of claim 4, further comprising the steps of:
establishing a control setpoint for at least one of the differential pressure gage, the hot-wire anemometer, and combinations thereof;
energizing the bypass fan; and
adjusting the speed of the bypass fan to control the recirculated exhaust gas volume in accordance with the control signal.

6. The method of claim 5, wherein the control setpoint for the differential pressure gage is in the range of 0 to 0.01 psig.

7. The method of claim 4, wherein the recirculated exhaust gas (REG) system further comprises at least one control damper.

8. The method of claim 7, further comprising the steps of:
establishing a control setpoint for at least one of the differential pressure gage, the hot-wire anemometer, and combinations thereof;
energizing the bypass fan; and
adjusting the position of the at least one control damper to control the recirculated exhaust gas volume in accordance with the control signal.

9. The method of claim 8, wherein the control setpoint for the differential pressure gage is in the range of 0 to 0.01 psig.

10. The method of claim 1, further comprising the step of:
supplying the recirculated exhaust gas volume to an inlet section, at least one turbomachine casing opening, an ambient REG exhaust, and combinations thereof.

11. The method of claim 2, wherein the recirculated exhaust gas (REG) system further communicates with a CCPP internal control system configured to adjust a control setpoint for the recirculated exhaust gas volume above the minimum purge airflow.

12. A system for actively controlling draft through a combined cycle power plant (CCPP), comprising:
a turbomachine,
a heat recovery steam generator (HRSG) comprising a HRSG exhaust stack,
a bypass exhaust stack, and
a recirculated exhaust gas (REG) system configured to;
activate when a CCPP shutdown is initiated,
measure an HRSG airflow through the HRSG;
communicate the HRSG airflow to a controller configured to condition a control signal; and
adjust a recirculated exhaust gas volume through a REG system in accordance with the control signal.

13. The system of claim 12, wherein the recirculated exhaust gas (REG) system further comprises a minimum purge airflow.

14. The system of claim 12, wherein the HRSG airflow is measured by a differential pressure gage, hot-wire anemometer, and combinations thereof.

15. The system of claim 12, wherein the recirculated exhaust gas (REG) system further comprises a bypass fan.

16. The system of claim 15, wherein the REG system is further configured to:
establish a control setpoint for at least one of the differential pressure gage, the hot-wire anemometer, and combinations thereof;
energize the bypass fan; and
adjust the speed of the bypass fan to control the recirculated exhaust gas volume in accordance with the control signal.

17. The system of claim 16, wherein the control setpoint for the differential pressure gage is in the range of 0 to 0.01 psig.

18. The system of claim 15, wherein the recirculated exhaust gas (REG) system further comprises at least one control damper.

19. The system of claim 16, wherein the REG system is further configured to:
establish a control setpoint for at least one of the differential pressure gage, the hot-wire anemometer, and combinations thereof;
energize the bypass fan; and
adjust the position of the at least one control damper in accordance with the control signal.

20. The system of claim 12, wherein the REG system is further configured to:
supply the recirculated exhaust gas volume to an inlet section, at least one turbomachine casing opening, an ambient REG exhaust, and combinations thereof.

* * * * *